United States Patent [19]
Fewkes et al.

[11] Patent Number: 5,925,308
[45] Date of Patent: *Jul. 20, 1999

[54] RAPID-SETTING FORMABLE MIXTURES AND METHOD OF MAKING AND USING SAME

[75] Inventors: Edward J. Fewkes; Frances M. Smith; Lung-Ming Wu, all of Horseheads, N.Y.

[73] Assignee: Corning Incorporated, Corning, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/900,163

[22] Filed: Jul. 28, 1997

Related U.S. Application Data

[60] Provisional application No. 60/023,181, Aug. 5, 1996.

[51] Int. Cl.$^6$ .............................. C04B 38/06; C08K 3/00; B22F 1/00
[52] U.S. Cl. ......................... 264/623; 264/630; 264/670; 419/36; 419/37; 419/65; 524/404; 524/413; 524/424; 524/428; 524/439; 524/440; 524/441; 524/442; 524/443; 524/444; 524/445; 524/446
[58] Field of Search ..................................... 264/623, 630, 264/670; 419/36, 37, 65; 524/404, 413, 424, 428, 439, 440, 441, 442, 443, 444, 445, 446

[56] References Cited

U.S. PATENT DOCUMENTS

| | | |
|---|---|---|
| 3,885,977 | 5/1975 | Lachman et al. . |
| 4,293,514 | 10/1981 | Wada et al. .............................. 264/630 |
| 4,758,272 | 7/1988 | Pierotti . |
| 4,992,233 | 2/1991 | Swaroop et al. . |
| 5,258,205 | 11/1993 | Wu . |
| 5,427,601 | 6/1995 | Harada et al. . |
| 5,700,419 | 12/1997 | Matsunaga et al. ..................... 264/657 |

OTHER PUBLICATIONS

"Reversible Polymer Complexes Stabilized Through Hydrogen Bonds", Chapter 6, pp. 73–86.

*Primary Examiner*—James Derrington
*Attorney, Agent, or Firm*—L. Rita Herzfeld

[57] ABSTRACT

A method of producing a formable mixture involves combining a powder material, and a plurality of gel-forming polymers, wherein at least one gel-forming polymer is a proton donor, and at least one gel forming polymer is a proton acceptor. A method of making a monolithic structure involves producing a formable mixture of powder material which can be ceramic, metal, glass, glass ceramic, molecular sieve and combinations thereof, a plurality of gel-forming polymers as described above, extruding the mixture to form a green monolithic structure, and drying and firing the green structure.

15 Claims, No Drawings

RAPID-SETTING FORMABLE MIXTURES AND METHOD OF MAKING AND USING SAME

This application claims the benefit of U.S. Provisional Application Ser. No. 60/023,181, filed Aug. 5, 1996, entitled "RAPID-SETTING FORMABLE MIXTURES AND METHOD OF MAKING AND USING SAME", by Edward J. Fewkes, Frances M. Smith and Lung-Ming Wu.

This invention relates to a method of producing a formable mixture which can be shaped into a monolithic structure, more particularly, extruded into a honeycomb structure. The mixture is made by combining powders with specific gel-forming components in an aqueous environment. The gel-forming components form a gel which functions as a binder and serves to stiffen the structure by expulsion of water and increasing the modulus of the binder. The benefits of this gel formation are that the strength of the structure is increased and drying time is decreased due to the rapid expulsion of water.

BACKGROUND OF THE INVENTION

Powder mixtures having binders are used in forming articles of various shapes. For example ceramic or metal powder mixtures having cellulose ether binders, are formed into honeycombs which are used as substrates in catalytic and adsorption applications. The mixtures must be well blended and homogeneous in order for the resulting shaped body to have good integrity in size and shape and uniform physical properties.

Rapid-setting characteristics are especially important for honeycomb substrates. If the cell walls of the honeycomb can be solidified quickly after forming, the dimension of the greenware will not be altered in subsequent cutting and handling steps. This is especially true for a fragile thin-walled or complex shaped product, or a product having a large frontal area.

Various techniques have been disclosed for rapid stiffening of such batches, such as adding various rapid setting additives e.g. surfactants, binders and water soluble polymers as disclosed in U.S. Pat. No. 5,258,205.

There still remains a need to further improve the setting up characteristics of formable mixtures.

The present invention fills this need.

SUMMARY OF THE INVENTION

In accordance with one aspect of the invention, there is provided a method of producing a formable mixture that involves combining a powder material, and a plurality of gel-forming polymers, wherein at least one gel-forming polymer is a proton donor, and at least one gel forming polymer is a proton acceptor. In accordance with another aspect of the invention, there is provided a method of making a monolithic structure that involves producing a formable mixture of powder material which can be ceramic, metal, glass, glass ceramic, molecular sieve and combinations thereof, a plurality of gel-forming polymers as described above, extruding the mixture to form a green monolithic structure, and drying and firing the green structure.

DETAILED DESCRIPTION OF THE INVENTION

This invention relates to a method of improving the stiffening characteristics of filled formable, e.g. extrudable powder mixtures, that is, powders and binder in aqueous medium. The improved stiffening is due to inclusion in the mixtures of water soluble polymer gel-forming components, one component being a proton donor, and the other a proton acceptor.

The Powder Material

In general, the invention is not limited to any powder. It is especially suited for inorganic refractory powders, which when combined with the gel-forming agents can be shaped into a monolithic structure. Such powders find use as substrates for catalysts, adsorption agents, etc., or filters.

Typical powders are metal, ceramic, glass ceramic, glass, and molecular sieve, or combinations of these.

Any sinterable metal or metal composition can be used in the practice of the present invention. Especially suited are iron group metal, chromium, and aluminum compositions, with the preferred iron group metal being iron. Especially preferred is Fe, Al, and Cr. For example, Fe5-20Al5-4OCr, and Fe7-10Al10-2OCr powders with other possible additions are especially suited. Some typical compositions of metal powders are disclosed in U.S. Pat. Nos. 4,992,233, 4,758,272, and 5,427,601 which are herein incorporated by reference as filed. U.S. Pat. No. 4,992,233 relates to methods of producing porous sintered bodies made from metal powder compositions of Fe and Al with optional additions of Sn, Cu, and Cr. U.S. Pat. No. 5,247,601 relates to porous sintered bodies having a composition consisting essentially of in percent by weight about 5 to about 40 chromium, about 2 to about 30 aluminum, 0 to about 5 of special metal, 0 to about 4 of rare earth oxide additive and the balance being iron group metal, and unavoidable impurities such as eg., Mn or Mo, with the preferred iron group metal being iron. When rare earth oxide is present, the special metal is at least one of Y, lanthanides, Zr, Hf, Ti, Si, alkaline earth metal, B, Cu, and Sn. When no rare earth oxide is present, the special metal is at least one of Y, lanthanides, Zr, Hf, Ti, Si, and B, with optional additions of alkaline earths, Cu, and Sn.

In general the metal and/or metal alloy powders and optionally rare earth oxide powders are mixed in amounts to result in the body having the desired composition. The starting metal powders are iron, cobalt, nickel, chromium, aluminum metals, and special metal powders, if they are to be used. The metal can be supplied in either the unalloyed form or alloyed with one or more of the other metals, or partially unalloyed and partially alloyed. Most typically, however, the iron, when added as the balance, is in the elemental form. The chromium can be elemental or alloyed with aluminum or iron. Chromium-aluminum alloy is preferable. Typically, the aluminum is supplied alloyed with iron and/or chromium for stability. Some typical alloy powders that can be used in formulating the mix to yield a body having some typical compositions of the present invention are Fe—Cr—Al— (Y, lanthanide series elements, Zr, Hf, or Cu) alloy powder, Cr—Al—(Y, lanthanide series elements, Zr, Hf, or Cu) alloy powder, Fe—B, Fe—Si powder, etc.

In general, the powder material is fine powder (in contrast to coarse grained materials) some components of which can either impart plasticity, such as clays, when mixed with a vehicle such as water, or which when combined with an organic binder can contribute to plasticity.

By ceramic, glass ceramic and glass ceramic powders is meant those materials as well as their pre-fired precursors. By combinations is meant physical or chemical combinations, eg., mixtures or composites. Examples of these powder materials are cordierite, mullite, clay, talc, zircon, zirconia, spinel, aluminas and their precursors, silicas and their precursors, silicates, aluminates, lithium aluminosilicates, alumina silica, feldspar, titania, fused silica, nitrides, carbides, borides, eg., silicon carbide, silicon nitride, soda lime, aluminosilicate, borosilicate, soda barium borosilicate or mixtures of these, as well as others.

Especially suited are ceramic materials, such as those that yield cordierite, mullite, or mixtures of these on firing, some examples of such mixtures being, for example, about 55% to about 60% mullite, and about 30% to about 45% cordierite, with allowance for other phases, typically up to about 10% by weight. Some ceramic batch material compositions for forming cordierite that are especially suited to the practice of the present invention are those disclosed in U.S. Pat. No. 3,885,977 which is herein incorporated by reference as filed.

In accordance with one embodiment, one composition which ultimately forms cordierite upon firing is as follows in percent by weight, although it is to be understood that the invention is not limited to such: about 33 to about 41, and most preferably about 34 to about 40 of aluminum oxide, about 46 to about 53 and most preferably about 48 to about 52 of silica, and about 11 to about 17 and most preferably about 12 to about 16 magnesium oxide.

The powders can be synthetically produced materials such as oxides, hydroxides, etc, or they can be naturally occurring minerals such as clays, talcs, or any combination of these. The invention is not limited to the types of powders or raw materials. These can be chosen depending on the properties desired in the body.

Some typical kinds of powder materials are given below. The particle size is given as median particle diameter by Sedigraph analysis, and the surface area is given as $N_2$ BET surface area.

Some types of clay are non-delaminated kaolinite raw clay, having a particle size of about 7–9 micrometers, and a surface area of about 5–7 $m^2/g$, such as Hydrite MP™, those having a particle size of about 2–5 micrometers, and a surface area of about 10–14 $m^2/g$, such as Hydrite PX™, delaminated kaolinite having a particle size of about 1–3 micrometers, and a surface area of about 13–17 $m^2/g$, such as KAOPAQUE-10™, calcined clay, having a particle size of about 1–3 micrometers, and a surface area of about 6–8 $m^2/g$, such as Glomax LL. All of the above named materials are sold by Dry Branch Kaolin, Dry Branch, Ga.

Some typical kinds of talc are those having a surface area of about 5–8 $m^2/g$, such as supplied by Barretts Minerals, under the designation MB 96-67.

Some typical aluminas are coarse aluminas, for example, Alcan C-700 series, such as those having a particle size of about 4–6 micrometers, and a surface area of about 0.5–1 $m^2/g$, eg., C-701TM, fine alumina having a particle size of about 0.5–2 micrometers, and a surface area of about 8–11 $m^2/g$, such as A-16SG from Alcoa.

One typical kind of silica is that having a particle size of about 9–11 micrometers, and a surface area of about 4–6 $m^2/g$, such as IMSIL™ sold by Unimin Corporation.

In filter applications, such as in diesel particulate filters, it is customary to include a burnout agent in the mixture in an amount effective to obtain the porosity required for efficient filtering. A burnout agent is any particulate substance (not a binder) that burns out of the green body in the firing step. Some types of burnout agents that can be used, although it is to be understood that the invention is not limited to these, are non-waxy organics that are solid at room temperature, elemental carbon, and combinations of these. Some examples are graphite, cellulose, flour, etc. Elemental particulate carbon is preferred. Graphite is especially preferred because it has the least adverse effect on the processing. In an extrusion process, for example, the rheology of the mixture is good when graphite is used. Typically, the amount of graphite is about 10% to about 30%, and more typically about 15% to about 30% by weight based on the powder material.

Molecular sieves are crystalline substances having pores of size suitable for adsorbing molecules. The molecular sieve can be in the crystallized form or in the ammonium form or hydrogen form, or ion-exchanged with or impregnated with a cation. The molecular sieves can be provided in ion exchanged form or impregnated with cations either before forming into a body or after the product body has formed. The ion-exchange and impregnation methods are well known processes. Such treatments are within the scope of this invention.

Some types of molecular sieves which are preferred for the practice of the present invention are carbon molecular sieves, zeolites, metallophosphates, silicoaluminophosphates, and combinations of these. Carbon molecular sieves have well defined micropores made out of carbon material.

The molecular sieves that are especially suited to the invention are the zeolites. Some suitable zeolites are pentasil, such as ZSM-5, Y, such as ultrastable Y, beta, mordenite, X, such as 13X, or mixtures thereof.

In addition to the above types of powders, activated carbon forming mixtures, e.g. of activated carbon particles, or carbon precursors such as thermosetting resins can be combined with the gel formin-3 agents of this invention.

The gel-forming components

The gel-forming agents can be said to function as binders in this system. According to this invention "component" can mean one or more additives of a given type. For example there can be one or more proton donors and one or more proton acceptors. Also, it is to be understood that materials which can act as both proton donors and acceptors can be used and that how they function in the mixture is relative to the other gel component(s). The more suitable gel forming components and their most typical functions in the practice of this invention are described below.

The proton donors or Lewis acids are typically polymeric carboxylic acids and their copolymers, such as e.g., polymers and copolymers of acrylic acids, polyvinyl alcohol (PVA) and its copolymers, or any combination thereof. Preferred are polyacrylic acid (PAA), polymethacrylic acid (PMAA), PVA, and their copolymers, or any combination thereof. Copolymers of acrylic acid or methacrylic acid with esterified acrylates such as methyl methacrylate, methyl acrylate, butylacrylate, butyl methacrylate, etc. are suitable. Copolymers of acrylic or methacrylic acid formed by partial neutralization are also suitable, as are copolymers of acrylic or methacrylic acid with other vinyl monomers, oligomers, or necromonomers with which they are known to copolymerize, e.g. vinyl functionalized polyurethanes, styrene, acrylonitrile, or any combinations thereof. Especially preferred are PAA, PMAA and PVA. Gels made from PMAA are reported to be thermally reversible. Such a property can possibly be useful in processing in that for example, repeat processing can be done if necessary.

The proton acceptors or Lewis bases are typically polyethylene oxide (PEO), polyvinylpyrrolidone (PVP), PVA, and their copolymers, and combinations of these, with PEO, PVP, PVA, and combinations thereof, being preferred.

Polyvinyl alcohol and its copolymers can function either as proton donors if used with more basic material (e.g. PVP), or proton acceptors if used with more acidic material (e.g. PAA).

Some especially suitable gel forming agent combinations are: (1) PAA and PEO, (2) PAA and PVP, (3) PMAA and PEO, and (4) PMAA and PVP.

The two types of polymers form essentially a crosslinked three dimensional network called a gel by hydrogen bonding. Once the gel structure is attained, two notable changes can occur: the tensile modulus generally increases due to the formation of the three dimensional network and the solubility of the gel in the water decreases. These effects bring about a stiffening of the mixture when it is formed into a structure. The temperature at which the components are combined is maintained below that at which the particular gel is unstable.

The gel forming agents are provided typically in the form of solutions in an aqueous based solvent. The solvent is typically water, but other solvents can be used.

Besides the gel forming agents, other additives can be included in the mixture, if desired or deemed necessary, such as forming aids, surfactants, lubricants, etc.

The weight percents of each component in the mixture, (i.e. powder, gel forming agent, and solvent, etc.) are calculated as by the following formula:

$$\frac{\text{weight of component}}{\text{total weight of components}} \times 100.$$

Each gel-forming agent is present in solution at a level of typically about 2.5% to 30% and preferably about 15% to 25% by weight.

The powder and gel-forming agent (including solvent) mixture is made up typically of about 10% to 60%, by weight powder with the balance being the gel forming agent solutions, although greater or lesser amounts of powder can be used if feasible.

The powders, and gel-forming components and solvent, and other additives can be combined in any number of ways and it is to be understood that the invention is not limited to any specific method or technique. For example, they can be mixed together simultaneously. Alternately the gel-forming components can be combined with one another and with a solvent, usually water, and then added to the powders and other additives. For example one technique involves combining solutions of the gel forming agent solutions with the powders, or pre-combining the gel-forming agent solutions and then adding the combination solution to the powders.

The mixture of powders and gel forming agents can then be shaped into a monolithic structure, as for example by extrusion through a die. The extrusion can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die. The gel provides added strength and rigidity to the extruded structure exiting the die.

The structures according to the present invention can have any convenient size and shape. However, the process is especially suited to production of cellular monoliths such as honeycombs. Cellular bodies find use in a number of applications such as catalyst carriers, electrically heated catalysts, filters such as diesel particulate filters, molten metal filters, regenerator cores, etc.

Some examples of honeycombs that can be produced by the process of the present invention, although it is to be understood that the invention is not limited to such, are those having about 94 cells/cm$^2$ (about 600 cells/in$^2$) or greater to about 15 cells/cm$^2$ (about 100 cells/in$^2$) or less. Typical wall thicknesses are for example, about 0.15 mm (about 6 mils) for about 62 cells/cm$^2$ (about 400 cells/in honeycombs. Wall (web) thicknesses range typically from about 0.1 to about 0.6 mm (about 4 to about 25 mils). The external size and shape of the body is controlled by the application, e.g. in automotive applications by engine size and space available for mounting, etc.

The green structure can then be dried and fired to form the final structure. The extrudates can then be dried and fired according to known techniques except that drying times will be shorter due to less water in the extrudate.

One advantage of using the gel forming agents is that because the gels are thermally stable up to temperatures of at least about 80° C. or even higher depending on the gel-forming components, the strength of the green body is enhanced during drying.

The firing conditions of temperature and time depend on the composition and size and geometry of the body, and the invention is not limited to specific firing temperatures and times. For example, in compositions which are primarily for forming cordierite, the temperatures are typically from about 1300° C. to about 1450° C., and the firing times are from about 1 hour to about 6 hours. For mixtures that are primarily for forming mullite, the temperatures are from about 1400° C. to about 1600° C., and the firing times are from about 1 hour to about 6 hours. For cordierite-mullite forming mixtures which yield the previously described cordierite-mullite compositions, the temperatures are from about 1375° C. to about 1425° C. Firing times depend on factors such as kinds and amounts of materials and nature of equipment but typical total firing times are from about 20 hours to about 80 hours. For metal bodies, the temperatures are about 1000° C. to 1400° C. in a reducing atmosphere preferably hydrogen. Firing times depend on factors as discussed above but are typically at least 2 hours and typically about 4 hours. For carbon bodies, the temperatures are about 1000° C. to 1300° C. in a non-reacting atmosphere e.g. nitrogen. Firing times depend on factors as discussed above but are typically about 1 to 8 hours. For zeolite bodies, the temperatures are about 400° C. to 1000° C. in air. Firing times depend on factors as discussed above but are typically about 4 hours.

To more fully illustrate the invention, the following non-limiting examples are presented. All parts, portions, and percentages are on a weight basis unless otherwise stated.

EXAMPLE 1

Two 20% solutions were prepared of both polyacrylic acid (PAA) and polyethylene glycol (PEO) in water, and the solutions were combined. The storage modulus, G' and the loss modulus, G", of the solution in an unmeated state were measured. The gel point was determined from the point at which the ratio of G' to G" was 1. This ratio is commonly referred to as the tan delta. Upon combination of the polymeric solutions the formation of a gel was observed to occur at about 350 seconds. Upon gelation, a third phase was formed which contained primarily water, thus indicating that water expulsion upon gelation was large enough to be observable. Gel formation was observed with temperature.

The gels were observed to be stable and maintained up to a temperature of about 80° C.

EXAMPLE 2

A solution of 20% polyacrylic acid was added to a metal powder mixture of Fe—Cr—Al (in wt. parts approximately 23.3 Cr30Al, 1.7 electrolytic Cr, 0.3 Fe20B, 74.2 BASF Carbonyl OM, and 0.5 Rhone Poulenc $Y_2O_3$), and gelation was observed. Gelation times ranged from as short as about 470 seconds to a maximum of about 911 seconds.

EXAMPLE 3

A solution of 20% polyacrylic acid was added to a metal powder mixture as in Example 2, after which a 20% solution of PEO was added. The G' G" were measured, and tan delta values were determined with time. Gelation was observed to be more rapid in this case (averaging about 200 sec.), and was found to be reproducible in triplicate attempts. Water exclusion was again noticeable in the gels.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method of producing a formable mixture the method comprising combining a powder material, and a plurality of gel-forming polymers, wherein at least one gel-forming polymer is a proton donor, and at least one gel forming polymer is a proton acceptor, at a temperature and for a time sufficient to produce a ratio of storage modulus to loss modulus of 1. whereby said gel-forming polymers form a gel by hydrogen bonding when combined with each other.

2. A method of claim 1 wherein the powder material is selected from the group consisting of ceramic, metal, glass, glass ceramic, molecular sieve and combinations thereof.

3. A method of claim 1 wherein the proton donor component is selected from the group consisting of polymers of acrylic acids, copolymers of acrylic acids, polyvinyl alcohol, copolymers of polyvinyl alcohol, and combinations thereof.

4. A method of claim 3 wherein the proton donor component is selected from the group consisting of polyacrylic acid, polymethylacrylic acid, polyvinyl alcohol, and combinations thereof.

5. A method of claim 1 wherein the proton acceptor is selected from the group consisting of polyethylene oxide, copolymers of polyethylene oxide, polyvinylpyrollidone, copolymers of polyvinylpyrollidone, polyvinyl alcohol, copolymers of polyvinyl alcohol, and combinations thereof.

6. A method of claim 1 wherein the proton donor is polyacrylic acid and the proton acceptor is polyethylene oxide.

7. A method of claim 1 comprising the additional step of shaping the mixture into a monolithic structure.

8. A method of claim 7 wherein the mixture is shaped by extrusion.

9. A method of claim 8 wherein the mixture is extruded into a honeycomb structure.

10. A method of making a monolithic structure, the method comprising:
    a) producing a formable mixture comprising powder material selected from the group consisting of ceramic, metal, glass, glass ceramic, molecular sieve and combinations thereof, a plurality of gel-forming polymers, wherein at least one gel-forming polymer is a proton donor, and at least one gel forming polymer is a proton acceptor, at a temperature and for a time sufficient to produce a ratio of storage modulus to loss modulus of 1, whereby said gel-forming polymers form a gel by hydrogen bonding when combined with each other;
    b) extruding the mixture to form a green monolithic structure;
    c) drying the green structure; and
    d) firing the green structure to form the final monolithic structure.

11. A method of claim 10 wherein the proton donor component is selected from the group consisting of polymers of acrylic acids, copolymers of acrylic acids, polyvinyl alcohol, copolymers of polyvinyl alcohol, and combinations thereof.

12. A method of claim 11 wherein the proton donor component is selected from the group consisting of polyacrylic acid, polymethylacrylic acid, polyvinyl alcohol, and combinations thereof.

13. A method of claim 10 wherein the proton acceptor is selected from the group consisting of polyethylene oxide, copolymers of polyethylene oxide, polyvinylpyrollidone, copolymers of polyvinylpyrollidone, polyvinyl alcohol, copolymers of polyvinyl alcohol, and combinations thereof.

14. A method of claim 10 wherein the proton donor is polyacrylic acid and the proton acceptor is polyethylene oxide.

15. A method of claim 10 wherein the mixture is extruded into a honeycomb structure.

* * * * *